Feb. 23, 1965　　　F. J. AGES　　　3,170,485
MANIFOLD GAS VALVE
Filed May 5, 1961　　　2 Sheets-Sheet 1

INVENTOR.
FREDERIK J. AGES
BY
*Alan M. Staubly*
ATTORNEY

Feb. 23, 1965    F. J. AGES    3,170,485
MANIFOLD GAS VALVE
Filed May 5, 1961    2 Sheets-Sheet 2

INVENTOR.
FREDERIK J. AGES
BY
ATTORNEY

United States Patent Office 3,170,485
Patented Feb. 23, 1965

3,170,485
MANIFOLD GAS VALVE
Frederik J. Ages, Rolling Hills Estates, Calif., assignor to Honeywell Inc., a corporation of Delaware
Filed May 5, 1961, Ser. No. 108,173
2 Claims. (Cl. 137—613)

This invention relates to manifold valves and, more particularly, to manifold gas valves wherein all of the valves necessary for automatic and safe operation of a heating system are incorporated in a single valve unit.

While manifold valves of the above mentioned type are well known in the art, in view of the gradual decreasing size of heating units or plants, it is a continuing problem for heating controls manufacturers to design satisfactory controls for use in the very limited space provided for such controls in the heating units. It is a further problem in that in placing these controls in the heating units, there is not only the problem of installation, but the problem of adjusting the controls after they are installed.

It is one of the objects of this invention to provide a manifold valve of very small size without sacrificing the capacity of the valve any more than is absolutely necessary.

Another object of the invention is to provide a manifold valve wherein the adjustments for the various valve components are all made from one side of the valve body.

A still further object of the invention is to provide a manifold valve which is made up of a plurality of valve sub-assemblies which may be selectively useable to provide a plurality of different combinations of valves in a single valve unit.

Another object of the invention is to provide a manifold valve wherein the manifold may be initially sold with only one control means therein and may be subsequently added to, to provide one or more additional control functions, without removing the manifold valve body from its installed position.

A still further object of the invention is to provide in a manifold valve, a pressure regulator valve sub-assembly that is adapted to be mounted on the manifold valve on a surface other than that on which other control valves in the manifold are adjustable, with the means for varying the loading of the pressure regulator extending externally of the manifold valve body to a position wherein the loading may be adjusted from the same side of the manifold valve as the other valve adjusting means may be adjusted.

Still further objects of the invention will become apparent upon reading the following detailed description of the invention in conjunction with the accompanying drawing wherein.

Figure 1:
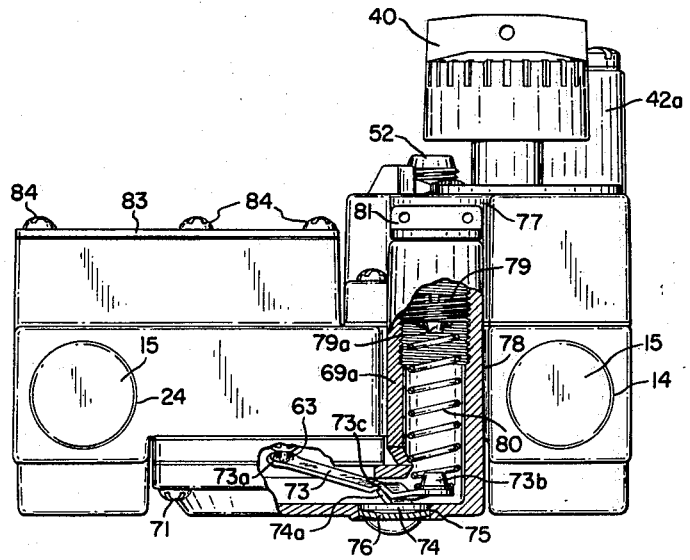
FIGURE 1 is a side elevational view of the manifold valve with portions thereof broken away.
Figure 2:
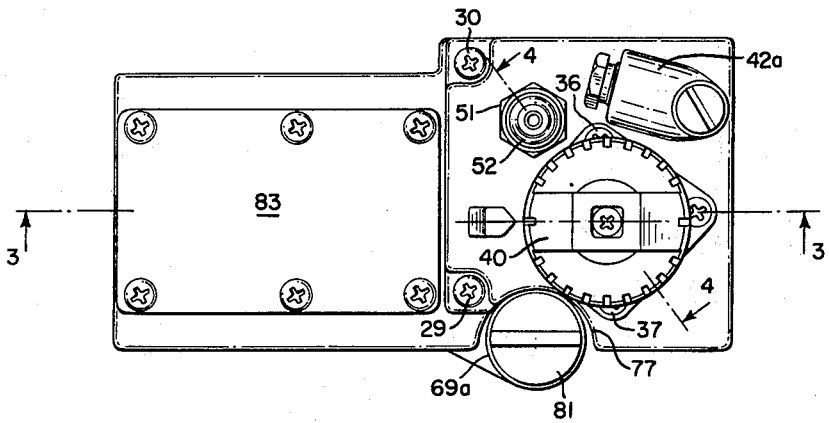
FIGURE 2 is a top plan view of the manifold valve.
Figures 3, 4, 5:
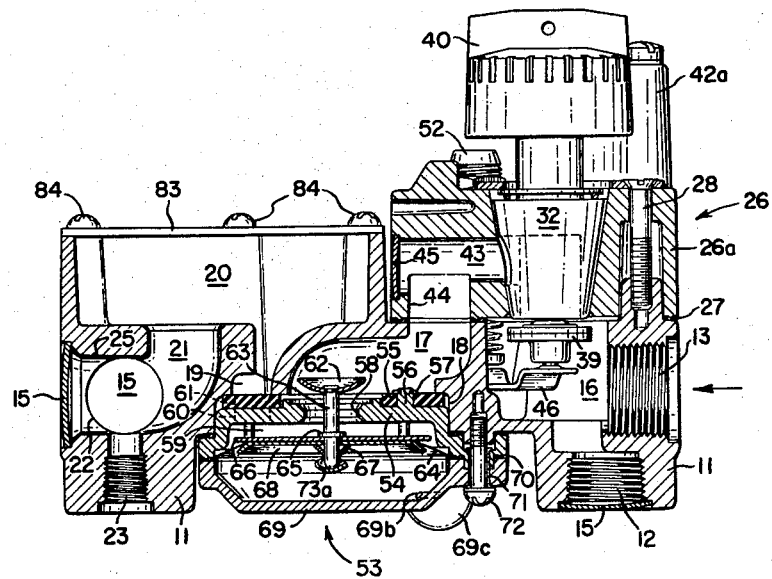
FIGURE 3 is a vertical sectional view taken along line 3—3 of FIGURE 2.
FIGURE 4 is a cross section of a portion of the valve taken along line 4—4 of FIGURE 2.
FIGURE 5 is a bottom view of the pressure regulator valve sub-assembly.

Referring to FIGURE 3 of the drawing, the manifold valve has a main valve body portion 11 with a plurality of selectively useable inlets 12, 13 and 14 therein (FIGURE 1). The inlets which are not used in any particular installation, are sealed by means of Welch plugs 15 or any other suitable sealing means. The inlets communicate with a cavity 16 that is open at its top. Another cavity 17, extending inwardly from the top of the valve body, also terminates in an enlarged diameter cavity 18 extending upwardly from the bottom of the valve body. The cavity 18, in turn, communicates through a passage 19 with another cavity 20 extending downwardly from the top of the valve body and communicating at the bottom thereof with an outlet passage 21 leading to a plurality of selectively useable outlets 22 and 23 and 24 (FIGURE 1). The outlets 22 and 24 are shown as being sealed by means of Welch plugs 15. A Welch plug 15 is also illustrated as closing an end opening 25, that could also be screw threaded to be used as an outlet, if so desired.

Sealing the open upper ends of the cavities 16 and 17 is a combined manually operable plug valve and safety valve sub-assembly generally designated by the reference numeral 26. The sub-assembly is bolted to the top of the valve body 11, with a sealing gasket 27 therebetween, by means of bolts 28, 29 and 30. As can best be seen in FIGURE 4 of the drawing, the sub-assembly has a conical recess 31 in which is positioned a plug valve 32. The plug valve is resiliently held in seating engagement with the bore 31 by means of a coil compression spring 33 extending between the top of the plug valve and a washer 34 which, in turn, bears against a plate 35. The plate is bolted to the top of the sub-assembly valve body 26a by means of bolts 36, 37, which are short in length, and bolt 28, which also serves to hold the sub-assembly 26 on the body 11. The plug valve has a hollow stem 32a extending upwardly from the top of the valve 32 and through the washer 34 and plate 35. One side of the stem is flattened to engage a flat portion on the inner diameter surface of the washer 34 so that the washer 34 will rotate with the valve plug. The washer has an upwardly extending arm that extends through the plate 35 and is adapted to engage abutments (not shown) on the plate to limit the angular movement of the plug valve at its "on" and "off" positions. The plug valve also has an axial bore extending upwardly from the lower end thereof to a point a short distance from the valve stem so as to provide a wall therebetween. An axial bore 37 through this wall serves as a guide means for a stem or plunger 38. The stem 38 has an annular shoulder member 38a secured thereto or formed thereon at the inner end of the recess 36 and has a reduced diameter portion 38b extending through the recess 36 to guideably support a safety valve 39 thereon. The stem 38 also extends upwardly through and beyond the hollow stem 32a and has fixedly secured to the upper end thereof a manually operable handle 40. The handle 40 has a non-round stem portion 40a that extends into a non-round complementary shaped recess forming the inner surface of the hollow sleeve 32a. It is thus seen that rotation of the handle 40 will rotate the stem 38 and also the plug valve 32 which, in turn, will rotate the washer 34. The handle portion 40a is axially slideable in the stem 32a and is biased outwardly thereof by a spring 40b. The plug valve 32 also has a radial bore 41 therein extending through a side wall thereof and establishing communication between the bore 36 and an arcuate groove 42 and a bore 43. The bore 43 leads from the conical bore 31 to a vertical bore 44 extending therefrom to register with an opening through the gasket 27 and communicate with the chamber 17. The arcuate groove registers with a passage (not shown) leading to a pilot burner outlet 42a in a conventional manner. A Welch plug 45 seals the outer end of the bore 43 beyond the vertical bore 44. It is thus seen that with the plug valve in its "on" position, and the safety valve 39 open, gas is able to pass from the inlet 13 past the safety valve 39 through bores 36, 42, 43, and 44 to the cavity 17. Gas is also adapted to flow from the bore 36 in the plug valve through bore 41 and arcuate groove 42 to the pilot outlet when the plug valve is in its "on" and "pilot" positions, in a conventional manner.

The safety valve 39 is adapted to move into and out of engagement with the lower end of the plug valve 32 by sliding on the plunger or stem 38. It is actuated to these positions by means of a spring 39a, between the shoulder 38a and the valve, and a lever 46 that is pivoted intermediate its ends to a downwardly extending lug 26b from the body 26a. A pivot 47 extends through the lug and through upwardly extending lever ears 46a positioned on opposite sides of the lug. The other end of the lever 46 is operably connected to an armature stem 48 of a conventional electromagnet 49. The electromagnet is secured in a cavity 50 in the housing 26a by means of a ring nut 51 screw threaded on a connector terminal 52 of the electromagnet extending through the top of the housing 26a. A coil compression spring 53 normally biases the lever so as to hold the valve 39 against the end of the plug valve to prevent gas flow through the gas valve. However, the stem 38 is adapted to move the safety valve to its open position by inward movement of the handle 40, in the pilot position of the plug valve, to position the armature of the electromagnet against the pole pieces of the electromagnet to place the valve in operation. If the magnet is energized by a thermocouple heated by a pilot burner, the armature will be held and the valve kept open in a conventional manner.

The main points of novelty in the invention lie in the pressure regulator sub-assembly, now to be described, and in its combination with the previously described portion of the manifold valve. The sub-assembly comprises a first body portion 54 having a sealing gasket 55 secured thereto by means of studs 56 extending through complementary apertures in the gasket and clamped thereon by means of clips 57 engaging in annular grooves in the upper ends of the studs 56. The body 54 has a valve seat opening 58 therein that registers with the cavity 17 in the body 11. The body portion 54 also has a pressure chamber 59 therein that communicates with cavity 20 through openings 60 and 61 through the top wall of the body portion 54 and gasket 55, respectively, and passage 19. A pressure regulator valve 62 is positioned in the cavity 17 adjacent the opening 58 and is secured to a valve stem 63 that extends through the opening 58 and is connected at its lower end to a diaphragm 64. The stem 63 has an annular abutment shoulder 65 thereon that bears against a backing plate 66 on the top side of diaphragm 64 and has a Tinnerman nut 67 positioned on the lower end thereof and bearing against a second backing plate 68 which clamps the diaphragm 64 against the plate 66 and the plate 66 against the annular shoulder 65. A second body portion 69 clamps the peripheral edge of the diaphragm 64 against the peripheral edge of the valve portion 54, with a sealing gasket 70 therebetween, by means of tubular rivets 71. The body portions 54 and 69 are bolted to the body 11 by means of bolts 72 extending through the hollow rivets 71 and screw threaded into threaded sockets in the body 11. The regulator valve 62 is biased to its open position by means of a pivoted lever 73 having a cupped end 73a engaging the lower end of the stem 63 and a spring retainer stud 73b at the other end thereof. The lever has an upwardly struck pivot portion 73c intermediate its ends which rests on the edge of an upwardly extending arm 74a of a plate 74, held in a bore 75 in the body portion 69, by means of a Welch plug 76. The spring retaining stud 73b is located at the bottom of a stack extension 69a that extends nearly to the top of the valve body 11 and partially lies in an arcuate groove or passageway 77 in the side of the valve body 26a and an arcuate groove or passageway 78 in the side of valve body 11. The upper end of the stack is internally screw threaded and has adjustably positioned therein a screw 79 having a spring retaining or positioning stud 79a thereon for variably loading a compression spring 80 extending between the adjusting screw 59 and the lever 73. A sealing cap 81 is screw threaded into the upper end of the stack to prevent gas leakage. Air can bleed into and out of the chamber below the diaphragm through a passage 69b in a hollow boss 69c. A plug 82, threaded into the boss 69c, has a flow limiting orifice 82a therein.

From the above description of the pressure regulator sub-assembly portion of the manifold valve, it is readily apparent that there is a material space saving feature of the design as well as provided a completely detachable pressure regulator as well as one that may be adjusted from the same side of the manifold valve as the other valves embodied therein, even though the regulator is positioned on the opposite side thereof. If the manifold valve does not need a pressure regulator, the sub-assembly may be completely removed and a plate secured across the opening provided for the regulator, leaving a completely operative manifold valve.

The cavity 20, covered by a plate 83, which is held over the cavity 20 by means of bolts 84, may be used to convert the manifold valve described above into a fully automatic one by substituting an automatic valve sub-assembly (not shown) for the plate 82. The automatic valve sub-assembly may take the form of a bulb and bellows operated valve, including a saddle type of valve seat adapted to fit over and around the upper end of cavity 21. The sub-assembly may also take the form of an electrically operated valve controlled by a remotely positioned room thermostat. In either of these cases, gas flowing from the pressure regulator valve 62 will first pass through the added valve before reaching the outlet cavity 21. Should the added valve be in the form of one having a temperature adjusting means on the top thereof, it is readily apparent that the adjustment thereof may be made from the same side of the valve body as the plug valve and the above described pressure regulator valve.

As each of the above described valve sub-assemblies is a complete unit in and of itself, except for inlet and outlet passages, it is readily apparent that any one thereof may be replaced by a suitable cover plate to eliminate the function of that particular unit. Therefore, it is obvious that there are a large number of possible combinations of valves capable of using the same basic manifold valve body. This materially reduces the cost per manifold valve and the stocking requirements of heating controls dealers, installers and manufacturers. Due to the compactness of the manifold valve, it may be used in many heating installations where the much larger prior art manifold valves are incapable of being used. It also has particular value in floor furnace installations where it is necessary or highly desirable that all of the controls be adjustable from above the valve body.

While I have described the preferred embodiment of the invention above, it is deemed to be apparent that various modifications may be made therein without departing from the spirit of the invention. Therefore, the scope of the invention should be determined from the appended claims.

The embodiments of the invention in which an exclusive property or privilege is claimed are defined as follows:

1. A compact manifold valve comprising a valve body having an inlet and an outlet and a plurality of open sided valve cavities between said inlet and outlet in opposite sides of said body; control valve means located in and closing one of said cavities and having manual actuating means extending into the atmosphere on one side of said valve body for manually adjusting said valve means; a passageway formed in said body and extending between said opposite sides; and a pressure regulator valve assembly, including a valve seat, a pressure responsive member and a cooperating pressure regulator valve positioned by said pressure responsive member, said pressure regulator valve assembly being located in and closing another of said cavities on the opposite side of said valve body from said one cavity, said valve assembly having adjustable resilient valve biasing means in the form of an elongated spring extending partially through said passageway as to enable said pressure regulator valve to be adjustable at said same one side as said manual actuating means is located and adjustable means in said passageway accessible from said one side and cooperating with said spring for varying the biasing effect thereof on said pressure regulator valve; the axes of said control valve means, said pressure regulator valve, and said spring all being substantially parallel to each other to enable the assembly to be as compact as possible.

2. A compact manifold valve comprising a valve body having an inlet and an outlet and a plurality of open sided valve cavities between said inlet and outlet on opposite sides thereof and a recess in a first wall thereof and extending between said sides; valve means located in and closing one of said cavities in one of said sides and having manual actuating means extending out of said one side for manually adjusting said valve means; and a detachable pressure regulator valve assembly including a housing member, a valve seat, a pressure responsive member, and a cooperating pressure regulator valve positioned by said pressure responsive member, said pressure regulator valve assembly being located in and closing another of said cavities on the opposite side of said valve body from said one side, said housing member having a hollow extension which projects from said assembly along and within said recess in said first wall toward said same one side as said manual actuating means is located and terminating adjacent thereto, resilient means located in said hollow extension for biasing said pressure regulator valve open against the pressure exerted by the gas on said pressure responsive member, and adjustable means in said hollow extension accessible from said one side for varying the bias of said resilient means, said pressure regulator valve assembly including said hollow extension being detachable to permit the substitution of another closure member for said other of said cavities when pressure regulation is not desired.

References Cited in the file of this patent
UNITED STATES PATENTS

| | | |
|---|---|---|
| 1,064,445 | Comstock | June 10, 1913 |
| 2,607,529 | Garner | Aug. 19, 1952 |
| 2,683,565 | Johnson et al. | July 13, 1959 |
| 2,905,389 | Eskin | Sept. 22, 1959 |
| 2,924,387 | Hajny | Feb. 9, 1960 |
| 2,987,257 | Sherlock | June 6, 1961 |
| 2,987,309 | Biggle | June 6, 1961 |
| 3,020,921 | Currie et al. | Feb. 13, 1962 |